United States Patent [19]
Carlson et al.

[11] Patent Number: 5,631,792
[45] Date of Patent: May 20, 1997

[54] TRIANGLE-SHAPED MOVABLE SHUTTER FOR DATA STORAGE DISKETTE CARTRIDGE

[75] Inventors: Bruce W. Carlson; Jon R. Clark, both of Minneapolis; William M. Dunbar, Cottage Grove, all of Minn.

[73] Assignee: Imation Corp., Oakdale, Minn.

[21] Appl. No.: 527,490

[22] Filed: Sep. 13, 1995

[51] Int. Cl.⁶ ............................................. G11B 23/03
[52] U.S. Cl. .................................................. 360/133
[58] Field of Search .................................... 360/133

[56] References Cited

U.S. PATENT DOCUMENTS

| | | | |
|---|---|---|---|
| 4,488,191 | 12/1984 | Oishi et al. | 360/133 |
| 4,581,670 | 4/1986 | Nemoto et al. | 360/133 |
| 4,644,435 | 2/1987 | Nemoto et al. | 360/133 |
| 4,648,001 | 3/1987 | Komatsu et al. | 360/133 |
| 4,698,714 | 10/1987 | Sugawara et al. | 360/133 |
| 4,743,994 | 5/1988 | Kato et al. | 360/133 |
| 4,799,123 | 1/1989 | Kanazawa et al. | 360/133 |
| 4,839,953 | 6/1989 | Mizuta | 360/133 |
| 4,849,844 | 7/1989 | Kato | 360/133 |
| 4,943,880 | 7/1990 | Muehlhausen et al. | 360/133 |
| 5,021,913 | 6/1991 | Overland et al. | 360/133 |
| 5,084,862 | 1/1992 | Fujita et al. | 369/291 |
| 5,255,145 | 10/1993 | Ambur et al. | 360/133 |

FOREIGN PATENT DOCUMENTS

| | | |
|---|---|---|
| 0411670A2 | 2/1991 | European Pat. Off. . |
| 2124012 | 2/1984 | United Kingdom . |

*Primary Examiner*—John H. Wolff
*Attorney, Agent, or Firm*—Eric D. Levinson

[57] ABSTRACT

A cartridge for a disc-shaped recording medium, the cartridge including a cover shell and a base shell which house a flexible, magnetic recording medium therebetween. A movable shutter is provided along a front edge of the cartridge for covering, when in the closed position, an opening in each shell which allows a read/write head to access the recording medium. The shutter is windowless and has triangle-shaped portions which cover the read/write head access openings. The shutter includes a raised rib along its periphery and has a rounded corner. A raised rib may also be provided on the cartridge shell adjacent the read/write head access opening to prevent debris particles from entering the interior of the cartridge via the head access opening. The shutter is reinforced to prevent bending and has a rounded corner to minimize the chance that the shutter corner will become snagged on some other object, such as loose clothing.

18 Claims, 3 Drawing Sheets

TRIANGLE-SHAPED MOVABLE SHUTTER FOR DATA STORAGE DISKETTE CARTRIDGE

FIELD OF THE INVENTION

The present invention relates generally to cartridges for housing disc-shaped data storage media, and more specifically to the movable shutters on such cartridges.

BACKGROUND OF THE INVENTION

Floppy magnetic recording discs are flexible discs of polyester resin or the like having a magnetic layer on each side thereof on which information is recorded by a magnetic head. Floppy discs which have a diameter of 3 ½ inches (8.9 cm) or less are known as micro-floppy discs. Generally, the micro-floppy disc is accommodated in a hard casing to form a cartridge. The micro-floppy disc comprises a circular magnetic recording medium which is thin, has a small diameter, and has a hub fixed to the center of the recording medium.

The cover and back shells of a typical micro-floppy disc cartridge are shown in FIGS. 1 and 2. As shown in FIG. 1, cover shell 10 has a recessed portion 12 which is configured to receive a shutter 14 having a window 15. When in the closed position, shutter 14 covers opening 16 in shell 10 which is designed to allow a disc drive to access a disc-shaped recording medium (not shown) within the cartridge. When shutter 14 is opened, window 15 in the shutter becomes aligned with opening 16 in shell 10, allowing a drive to read/write the medium.

As shown in FIG. 2, back shell 20 has a recessed portion 22 configured to receive shutter 14 having a window 25. When shutter 14 is opened, window 25 in the shutter is aligned with opening 26 in back shell 20. Unlike cover shell 10, back shell 20 has a central hole 28 for exposing the central hub of the disc-shaped medium (not shown).

SUMMARY OF THE INVENTION

The shutter illustrated in FIGS. 1 and 2 suffers from several drawbacks. Because the shutter 14 has windows 16 and 26 formed therein, the shutter has portions 18 and 19, respectively, which are typically only about 1.5 mm wide. These thin portions 18 and 19 of shutter 14 can be damaged during handling or transporting of the assembled cartridge. If force is applied to thin portions 18 and 19 of shutter 14, the shutter may bend in that area, raising the edge of the shutter off the cartridge shell surface. The raised shutter may catch onto clothing or papers. Additionally, the shutter may become caught in the drive, resulting in possible damage to the drive, including damage to the read/write head and possible loss of data on the storage medium.

These three disadvantages are overcome by the shutter of the present invention which does not have the weak spot described above, is reinforced to prevent bending, and tapers to a rounded end to minimize the likelihood that the shutter will become snagged on some object, such as loose clothing.

The present invention is directed to a movable shutter configured for use on a cartridge for housing a disc-shaped recording medium. The cartridge includes a cover shell and a base shell which house the disc-shaped recording medium, i.e., a flexible magnetic medium, between them. An opening is provided in at least one of the shells to allow a read/write head to access the medium. The movable shutter covers the opening, when in the closed position, and has a portion (or member) which is approximately triangular in shape. If head access openings are provided on both sides of the cartridge, triangle-shaped shutter portions are also provided on both sides of the cartridge.

In preferred embodiments, the triangle-shaped portions are right triangles having an opposite angle, $\alpha$ (see FIG. 3), of from 40° to 80°, more preferably 50° to 70°. The corner of the portion of the shutter closest to the center of the cartridge is preferably rounded, and has a radius of curvature, r, from 4 to 8 mm, more preferably from 5 to 7 mm.

The two triangle portions of the shutter are preferably held together by a third "spine" portion which is perpendicular to the two triangular portions and which extends along the edge of the cartridge. The shutter is preferably formed from a single sheet of metal which has been bent to form the finished shutter.

In one embodiment, a raised rib is provided along the two edges of the triangular portion of the shutter opposite the front edge of the cartridge. This raised rib is preferably about 0.25 to 1.25 mm wide and about 0.05 to 0.20 mm high.

A raised rib may also be provided on the cartridge shell adjacent the edge of the head access opening (and therefore adjacent the edge of the triangular portion of the shutter in the closed position). This raised rib helps to prevent debris particles from entering the interior of the cartridge via the head access opening. The raised rib preferably is about 0.1 to 0.25 mm high, 0.3 to 1 mm wide, and less than 0.6 mm from the edge of the shutter in the closed position.

The present invention also includes a shutter having a rectangular stem and a head in the shape of an isosceles triangle. The shutter is bent along two lines which extend along the length of the stem and continue through the height of the head so that the left side of the head is in register with, parallel to, and spaced from the right side of the head. The central portion of the stem and head between the two bending lines is perpendicular to the two sides of the head.

DETAILED DESCRIPTION

Figure 1:
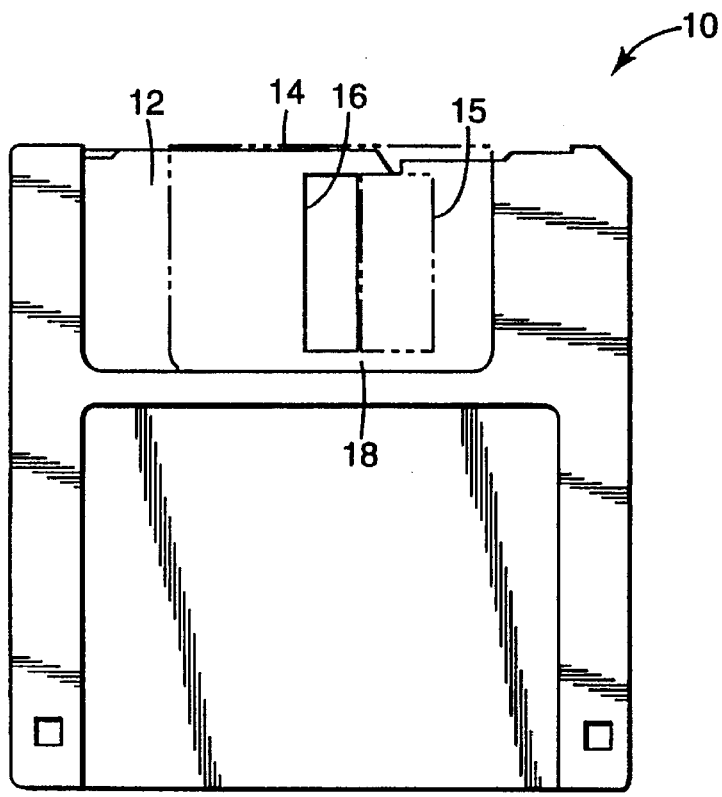
FIG. 1 shows a planar view of a prior art diskette cartridge cover shell.
Figure 2:
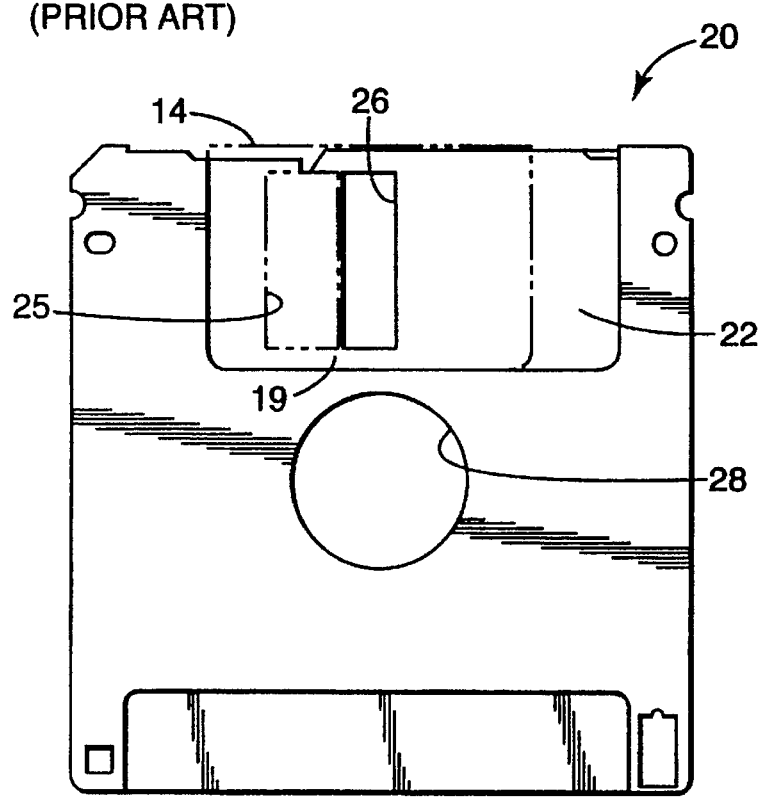
FIG. 2 shows a planar view of a prior art diskette cartridge back shell.
Figure 3:
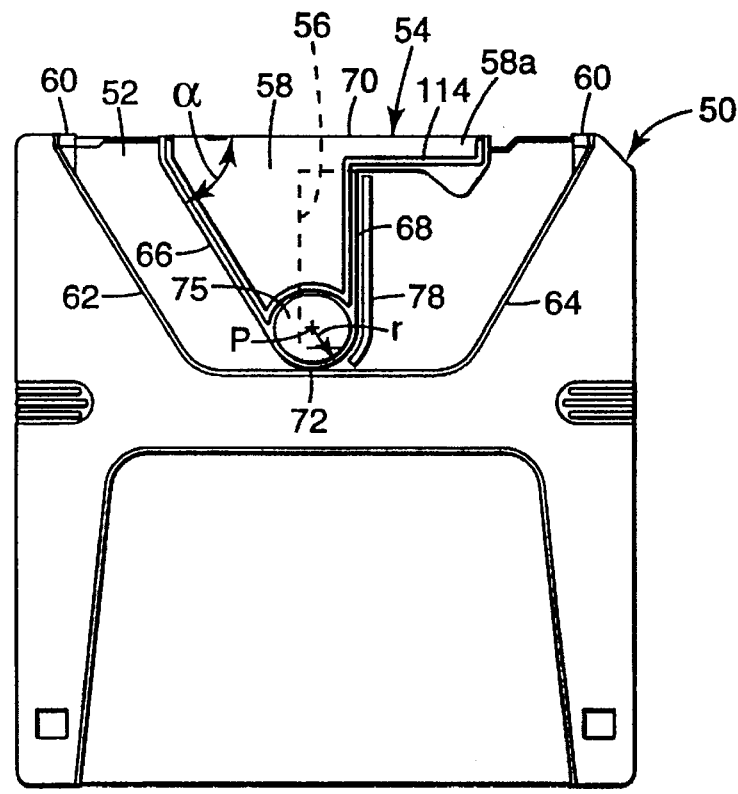
FIG. 3 shows a planar view of a diskette cartridge cover shell having a shutter according to the present invention.
Figure 4:
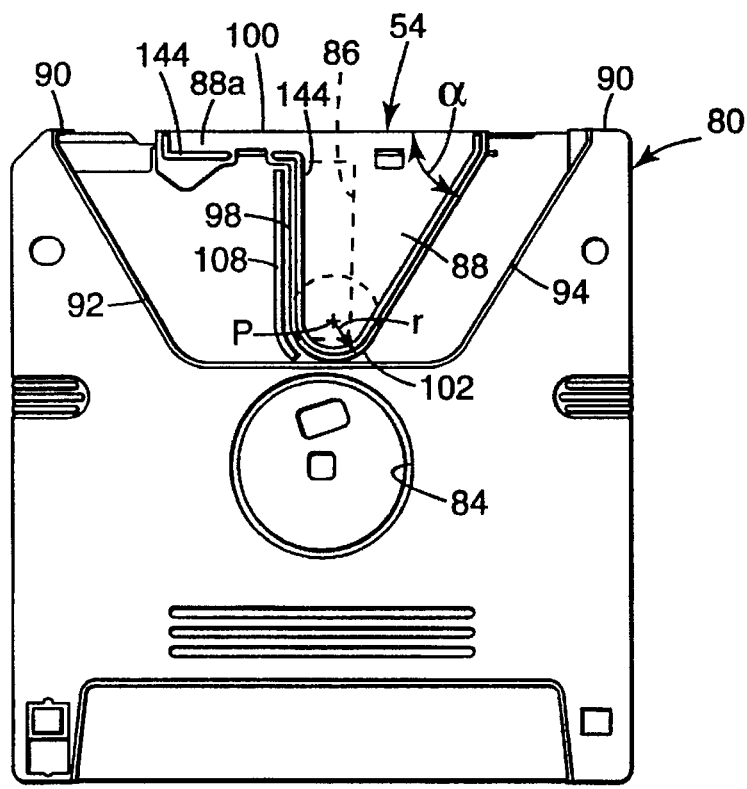
FIG. 4 shows a planar view of a diskette cartridge back shell with the shutter shown in FIG. 3.

The front and back of a cartridge having a shutter 54 according to the present invention are shown in FIGS. 3 and 4. As shown in FIG. 3, cover shell 50 has a recessed area 52 adapted to allow shutter 54 to move between a closed position (when the shutter protects the storage medium by covering medium access opening 56) and an open position (when the shutter is moved to allow a read/write head to access the storage medium). Because shutter 54 has an edge 66 which is oriented at an angle $\alpha$ with respect to front edge 60 of cartridge 50, recessed portion 52 has a first edge 62 which is oriented at a similar angle to the front edge of the cartridge, so that side 62 of the recessed portion is parallel to side 66 of the shutter. Recessed portion 52 has a second edge 64 which mirrors first edge 62, thereby giving the recessed portion a symmetrical appearance.

Unlike prior art shutter 14, when shutter 54 is viewed as shown in FIG. 3, it appears to be triangle-shaped, and not rectangular. And unlike prior art shutter 14, shutter 54 has no window-the storage medium is accessed by moving the shutter away from medium access opening 56 in cover shell 50.

As illustrated in FIG. 3, shutter 54 has a substantially planar member 58 that is triangular. Triangular member 58 is defined by three edges: first edge 68 which is parallel to the side edges of cover shell 50, a second side 70 which is adjacent and parallel to front edge 60 (and is thus perpendicular to first edge 68), and third edge 66 which forms an angle α with respect to the second edge. Angle α is preferably within the range from 40° to 80°, more preferably from 50° to 70°; and most preferably is about 60°, e.g., 58°.

A raised rib 78 is provided on recessed portion 52 of cover shell 50. Raised rib 78 is parallel and adjacent to first edge 68 of triangular shutter member 58 when shutter 54 is in the closed position. Raised rib 78 preferably has a height within the range from 0.1 to 0.25 mm, and is more preferably about 0.175 mm. Raised rib 78 preferably has a width within the range from 0.3 to 1 mm, more preferably 0.3 to 0.6 mm, and is most preferably about 0.4 mm. Raised rib 78 is preferably spaced from first edge 68 of shutter 54 by a distance within the range from 0 to 0.6 mm, more preferably 0.2 to 0.4, and most preferably about 0.3 mm. Raised rib 78 helps to prevent debris particles from being transported by air flow or forced under shutter 54 and onto the storage medium (not shown) via opening 56 in cover shell 50, where the debris particles might interfere with the reading/writing of the medium. This is especially helpful when high storage capacity media is housed within the cartridge.

First and third edges 68 and 66 of triangular shutter member 58 converge at corner 72. In order to prevent corner 72 from possibly catching on some material, e.g., cloth, corner 72 may be rounded, as shown in FIG. 3. For example, corner 72 may be rounded so that it has a radius of curvature, r, about a point, P. The radius of curvature, r, should be within the range from 8 mm to 4 mm, more preferably 7 mm and 5 mm, and most preferably is about 6 mm.

Back shell 80 may also be provided with a medium access opening 86 which may be covered by shutter 54, as shown in FIG. 4. Back shell 80 has a central hole for exposing the central hub (not shown) of the disc-shaped medium (not shown). Like cover shell 50, back shell 80 has a recessed portion 82 with edges 92 and 94 configured to accommodate the movement of shutter 54 and to create a symmetrical appearance.

Shutter 54 has a second triangular planar member 88 which is similar in shape to first planar member 58. Triangular member 88 is defined by three edges: first edge 98 which is parallel to the side edges of back shell 80, second edge 100 which is adjacent and parallel to front edge 90 (and thus is perpendicular to first edge 98), and third edge 96 which forms an angle α (as described above) with respect to the second edge.

A raised rib 108 is provided on recessed portion 82 of back shell 80. Raised rib 108 is adjacent and parallel to first edge 98 of triangular shutter member 88 when shutter 54 is in the closed position. Raised rib 108 preferably has dimensions similar to those given for raised rib 78.

First and third edges 98 and 96 of triangular shutter member 88 converge at corner 102. Like corner 72, corner 102 may be rounded to prevent shutter 54 from possibly catching on some material. Corner 102 may be rounded to a radius of curvature, r, around a point P as discussed above for corner 72.

Figure 5:
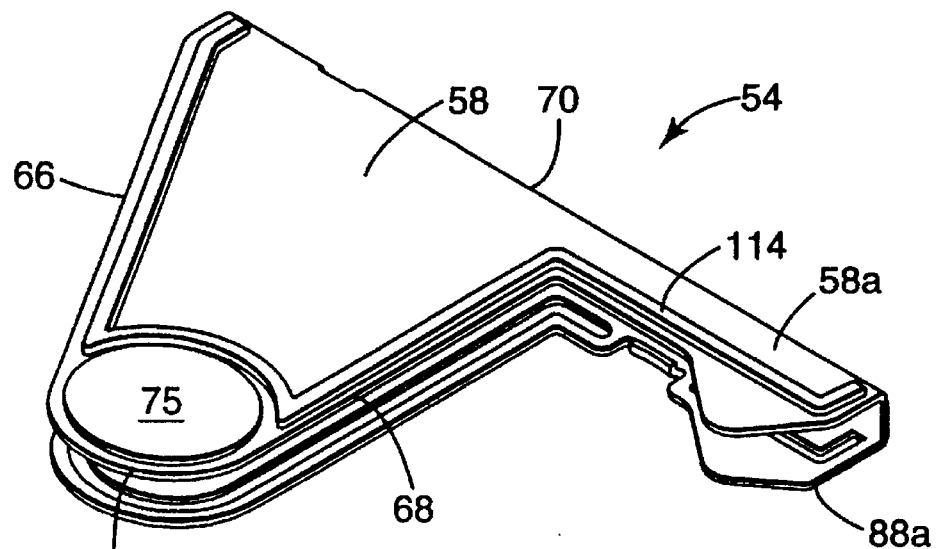
FIG. 5 shows a perspective view of the shutter shown in FIGS. 3 and 4.
Figure 6:
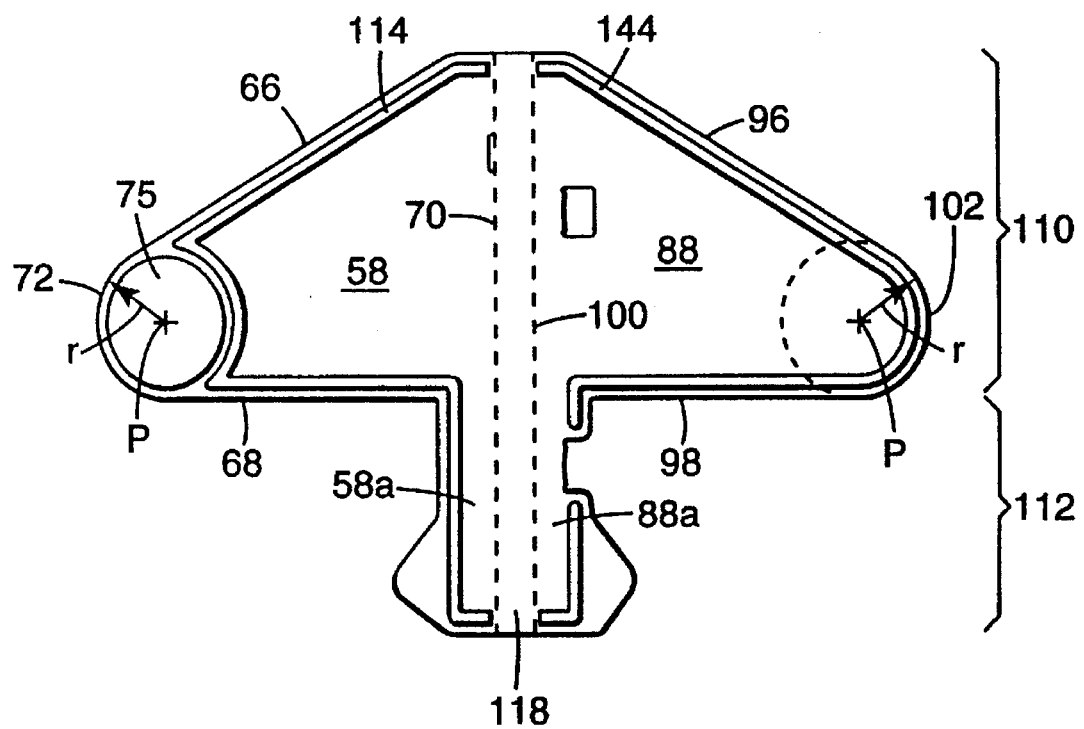
FIG. 6 shows the shutter of FIG. 5 prior to being bent into shape.

A perspective view of shutter 54 in its final form before assembly onto a cartridge shell is shown in FIG. 5. An overhead view of shutter 54 prior to being bent as shown in FIG. 5 is shown in FIG. 6. Shutter 54 is somewhat mushroom-shaped and has a triangular head 110 and a stem 112. Head 110 is comprised primarily of first triangular planar member 58 and second triangular planar member 88. In order to bend shutter 54 as shown in FIG. 5, it is necessary to bend the shutter along dashed lines 70 and 100 as shown in FIG. 6. Thus, shutter 54 is bent so that first and second triangular members 58 and 88 are parallel to and spaced from each other, and spine 118 is perpendicular to both members. As shown in FIGS. 5 and 6, shutter 54 is bent so that first and second side stem portions 58a and 88a are also parallel to and spaced from each other.

Raised ribs 114 and 144 are provided around the periphery of shutter 54. Rib 114 follows third edge 66 and first edge 68 of first planar member 58 and extends parallel to the length of first side stem portion 58a. Similarly, rib 144 follows third edge 96 and second edge 98 of second planar member 88 and also extends parallel to the length of second side stem portion 88a. While raised rib 114 is shown as not following the periphery of head 110 at corner 72, the rib may nevertheless be provided along the periphery in that area too, as is the case with raised rib 144 at corner 102. If raised rib 114 does not follow the periphery of head 110 at corner 72, it is desirable to form a raised area 75 (shown as a circle) near the corner of the head. Raised area 75 adds strength to planar member 58.

The portions of raised ribs 114 and 144 along the peripheries of edges 66 and 68 and 96 and 98, respectively, strengthen first and second planar members 58 and 88, respectively, thus decreasing the likelihood that the planar members of the shutter will become damaged. Raised ribs 114 and 144 preferably have a height within the range from 0.05 to 0.20 mm, more preferably 0.05 to 0.125 mm, and most preferably are about 0.075 mm. Raised ribs 114 and 144 preferably have a width within the range from 0.25 to 1.25 mm, more preferably 0.5 to 1 mm, and most preferably about 0.9 mm. Raised ribs 114 and 144 are preferably spaced from the edges of triangular planar members 58 and 88, respectively, by a distance within the range from 0.25 to 1.25 mm, more preferably 0.5 to 1.0 mm, and most preferably about 0.9 mm.

Shutter 54 may be made from known shutter materials, such as stainless steel, aluminum, or plastic. The shutter material preferably has a thickness in the range from 0.13 to 0.3 mm; for stainless steel, from 0.15 to 0.22 mm, e.g., 0.18 mm.

Although the shutter according to the present invention has been described for use with conventional flexible magnetic diskettes, those skilled in the art will appreciate that the present invention may be used with LASER SERVO diskettes manufactured by 3M Company, St. Paul, Minn., which record data magnetically but use a laser for tracking, as well as with other disc-shaped storage media, such as optical discs, e.g., magneto-optical discs, phase-change media, etc.

What is claimed is:

1. A cartridge for a disc-shaped recording medium, the cartridge including a cover shell and a base shell which house the disc-shaped medium therebetween, wherein an opening is provided in at least one of the shells to allow a read/write head to access the medium, and wherein a movable shutter is provided along a front edge of the cartridge, the shutter having a substantially planar member for covering the opening when in the closed position, the member being approximately triangular in shape, the shade being defined by three edges: a first edge substantially parallel to a side edge of the cartridge, a second edge adjacent and parallel to the front edge of the cartridge, and a third edge oriented toward the second edge at an angle, $\alpha$, wherein $40° \leq \alpha \leq 80°$.

2. The cartridge of claim 1, wherein each shell has an opening for allowing a read/write head to access the medium, and wherein the member is a first member, and wherein the shutter includes a second substantially planar member for covering the second opening when in the closed position, the second member being approximately triangular in shape.

3. The cartridge of claim 2, the shutter further including a third member extending along the front edge of the cartridge, wherein the first and second members are held together by the third member.

4. The cartridge of claim 3, wherein the shutter is formed from a single sheet of metal.

5. The cartridge of claim 1, wherein $50° \leq \alpha \leq 70°$.

6. The cartridge of claim 1, wherein the intersection of the first and third edges is curved, wherein the curve has a radius of curvature, r, wherein 4 mm $\leq r \leq$ 8 mm.

7. The cartridge of claim 6, wherein 5 mm $\leq r \leq$ 7 mm.

8. The cartridge of claim 1, further including a raised rib provided along the first and third edges of the first member.

9. The cartridge of claim 8, wherein the rib is spaced from the edge of the shutter by a distance within the range from 0.25 mm to 1.25 mm.

10. The cartridge of claim 8, wherein the rib has a width within the range from 0.25 mm to 1.25 mm and a height within the range from 0.05 mm to 0.20 mm.

11. The cartridge of claim 1, further including a raised rib provided on the cover shell parallel to and adjacent the side of the opening adjacent the first edge of the shutter when the shutter is in the closed position.

12. The cartridge of claim 11, wherein the raised rib on the cover shell has a height within the range from 0.1 mm to 0.25 mm.

13. The cartridge of claim 11, wherein the raised rib on the cover shell has a width within the range from 0.3 mm to 1 mm.

14. The cartridge of claim 11, wherein the raised rib on the cover shell is spaced from the first edge of the shutter, in the closed position, by less than 0.6 mm.

15. A shutter for use with a disc-shaped recording medium, the shutter comprising a rectangular stem and a head in the approximate shape of an isosceles triangle, wherein the stem extends to the middle of the base of the triangular head having left and right triangular portions, and wherein the shutter is bent along two lines which extend along the length of the stem and continue through the height of the head so that the left side of the head is in register with, parallel to, and spaced from the right side of the head, and a central portion of the stem and head between the two bending lines is perpendicular to the two sides of the head, and wherein the shutter is configured for use with a cartridge for a disc-shaped recording medium.

16. The shutter of claim 15, wherein the two corners of the triangular head on opposite sides of the stem are rounded so that they have a radius of curvature, r, wherein 4 mm $\leq r \leq$ 8 mm.

17. A cartridge for a disc-shaped, flexible magnetic recording medium, including a cover shell and a base shell which house the flexible, magnetic recording medium therebetween, wherein an opening is provided in each shell to allow a read/write head to access the medium, and wherein a movable shutter is provided along a front edge of the cartridge, the shutter having a first substantially planar member for covering one opening and a second substantially planar member for covering the other opening when the shutter is in the closed position, and a third member extending along a front edge of the cartridge and connecting the first and second members, wherein the first and second members are approximately triangular in shape, the shade being defined by three edges: a first edge substantially parallel to a side edge of the cartridge, a second edge adjacent and parallel to the front edge of the cartridge, and a third edge oriented toward the second edge at an angle, $\alpha$, wherein $40° \leq \alpha \leq 80°$.

18. The cartridge of claim 17, wherein the intersection of the first and third edges is curved, wherein the curve has a radius of curvature, r, wherein 4 mm $\leq r \leq$ 8 mm.

* * * * *